US011897227B2

(12) United States Patent
Wetsch et al.

(10) Patent No.: US 11,897,227 B2
(45) Date of Patent: Feb. 13, 2024

(54) DUNNAGE CUT-ASSIST BIASING MEMBER

(71) Applicant: Pregis Innovative Packaging LLC, Deerfield, IL (US)

(72) Inventors: Thomas D. Wetsch, Naples, FL (US); Robert Tegel, Huntely, IL (US)

(73) Assignee: Pregis Innovative Packaging LLC, Chicago, IL (US)

(*) Notice: Subject to any disclaimer, the term of this patent is extended or adjusted under 35 U.S.C. 154(b) by 1 day.

(21) Appl. No.: 17/588,785

(22) Filed: Jan. 31, 2022

(65) Prior Publication Data

US 2022/0227091 A1 Jul. 21, 2022

Related U.S. Application Data

(63) Continuation of application No. 15/282,885, filed on Sep. 30, 2016, now Pat. No. 11,235,548.

(Continued)

(51) Int. Cl.

*B31D 5/00* (2017.01)
*B65H 35/00* (2006.01)

(Continued)

(52) U.S. Cl.

CPC ......... *B31D 5/0043* (2013.01); *B31D 5/0039* (2013.01); *B65H 35/008* (2013.01); *B26D 1/025* (2013.01); *B26D 2001/006* (2013.01); *B26D 2007/082* (2013.01); *B26F 3/02* (2013.01); *B31D 5/0052* (2013.01); *B31D 2205/0023* (2013.01); *B31D 2205/0035* (2013.01);

(Continued)

(58) Field of Classification Search

CPC .......... B31D 5/0043; B31D 2205/0035; B31D 2205/0058; B31B 1/00

USPC ....... 493/340, 344, 350, 352, 353, 407, 459, 493/464, 967

See application file for complete search history.

(56) References Cited

U.S. PATENT DOCUMENTS 2,195,603 A * 4/1940 Steiner ............... B65H 35/0006 225/8
2,255,627 A * 9/1941 Steiner ............... A47K 10/3656 225/8

(Continued)

FOREIGN PATENT DOCUMENTS

JP S59037253 U 3/1984
JP 2013507306 A 3/2013

(Continued)

*Primary Examiner* — Jacob A Smith
(74) *Attorney, Agent, or Firm* — Fox Rothschild LLP

(57) ABSTRACT

A conversion apparatus is provided herein. The conversion apparatus includes a cutting member having an edge configured for cutting the dunnage material. The conversion apparatus also includes a biasing member that is located adjacent to the cutting member such that the dunnage material passes between the biasing member and the cutting member. The biasing member operably contacts the dunnage material thereby biasing the dunnage material against the cutting member. The position of the biasing member relative to the cutting member is such that in response to the dunnage material being retracted back into the conversion apparatus the cutting member begins to sever the dunnage material, but in response to the dunnage material traveling in the dispensing direction the cutting member does not begin to sever the dunnage material due to the relative position.

19 Claims, 9 Drawing Sheets

Related U.S. Application Data

(60) Provisional application No. 62/236,717, filed on Oct. 2, 2015.

(51) Int. Cl.

| | |
|---|---|
| *B26F 3/02* | (2006.01) |
| *B26D 1/02* | (2006.01) |
| *B26D 1/00* | (2006.01) |
| *B26D 7/08* | (2006.01) |

(52) U.S. Cl.

CPC ................ *B31D 2205/0058* (2013.01); *B31D 2205/0082* (2013.01); *B65H 2801/63* (2013.01)

(56) References Cited

U.S. PATENT DOCUMENTS

| | | | |
|---|---|---|---|
| 7,186,208 | B2 | 3/2007 | Demers et al. |
| 8,016,735 | B2 | 9/2011 | Wetsch et al. |
| 2005/0215408 | A1 | 9/2005 | Yampolsky et al. |
| 2008/0070773 | A1* | 3/2008 | Wetsch ................ B31D 5/0052 493/464 |
| 2008/0076653 | A1 | 3/2008 | Shaw et al. |
| 2008/0193263 | A1 | 8/2008 | Wetsch |
| 2008/0261794 | A1 | 10/2008 | Slovencik |
| 2009/0026306 | A1 | 1/2009 | Kempster et al. |
| 2011/0052875 | A1 | 3/2011 | Wetsch et al. |
| 2011/0053748 | A1 | 3/2011 | Wetsch et al. |
| 2012/0165172 | A1 | 6/2012 | Wetsch et al. |
| 2012/0193463 | A1 | 8/2012 | Newhouse et al. |
| 2013/0092716 | A1* | 4/2013 | Wetsch .................. A47K 10/32 225/77 |
| 2014/0274645 | A1 | 9/2014 | Wetsch et al. |

FOREIGN PATENT DOCUMENTS

| | | | |
|---|---|---|---|
| JP | 2014530129 | A | 11/2014 |
| WO | 2014145489 | A1 | 9/2014 |
| WO | 17059348 | A1 | 4/2017 |

* cited by examiner

DUNNAGE CUT-ASSIST BIASING MEMBER

CROSS-REFERENCE TO RELATED APPLICATION

This application is continuation of U.S. patent application Ser. No. 15/282,885, filed Sep. 30, 2016, which claims priority to U.S. Provisional Application No. 62/236,717, filed Oct. 2, 2015, which is hereby incorporated by reference in its entirety.

TECHNICAL FIELD

An apparatus for processing dunnage material is disclosed herein. More particularly, an apparatus for assisting a user in cutting the dunnage material at a desired point is disclosed.

BACKGROUND

In the context of paper-based protective packaging, paper sheet is crumpled to produce the dunnage. Most commonly, this type of dunnage is created by running a generally continuous strip of paper into a dunnage conversion machine that converts a compact supply of stock material, such as a roll of paper or a fanfold stack of paper, into a lower density dunnage material. The supply of stock material, such as in the case of fanfold paper, is pulled into the conversion machine from a stack that is either continuously formed or formed with discrete section connected together. The continuous strip of crumpled sheet material may be cut into desired lengths to effectively fill void space within a container holding a product. The dunnage material may be produced on an as-needed basis for a packer. Examples of cushioning product machines that feed a paper sheet from an innermost location of a roll are described in U.S. Pat. Pub. No. 2013/0092716, U.S. Pat. Pub. No. 2008/0076653, and U.S. Pat. Pub. No. 2008/0261794. Another example of a cushioning product machine is described in U.S. Patent Publication No. 2009/0026306. Each of these applications are hereby incorporated by reference in their entirety.

At a selected point along the process, a user may wish to sever the dunnage material so as to separate the material into two or more portions. Existing processing systems require excessive user interaction in the cutting process in order to sever the dunnage material. It would therefore be desirable to employ a dunnage conversion apparatus with a cutting apparatus. In particular, it would be desirable to employ an apparatus that reduces user interaction with the cutting process to sever a dunnage material at a desired point.

SUMMARY

In accordance with various embodiments, a conversion apparatus is provided herein. The conversion apparatus includes a cutting member having an edge configured for cutting the dunnage material. The conversion apparatus also includes a biasing member located adjacent to the cutting member and having a cutting position in which the dunnage material passes between the biasing member and the cutting member with the biasing member bending the dunnage material along a path around the end of the cutting member so that in response to the dunnage material being retracted back into the conversion apparatus the cutting member begins to sever the dunnage material.

In accordance with various embodiments, the path includes an elbow defined where the dunnage material is bent around the cutting member, wherein in the dispensing direction, the elbow biases the dunnage away from the cutting member but in the reverse direction the elbow biases the dunnage toward the cutting member. In various embodiments, the biasing member is movable between a cutting position and a dispensing position. In some embodiments, the cutting member includes teeth having adjacent points with a trough there between. The biasing member can include a plurality of fingers. The plurality of figures can be positioned relative to one another such that, in response to moving toward the cutting member and into the cutting position, each finger fits into the trough between the adjacent points of the cutting member teeth. In some embodiments, the conversion apparatus also includes a drum that is rotated by the drive mechanism and contacts the dunnage material to advance the dunnage material in the first direction and retract the dunnage material in the second direction within the apparatus. In some embodiments, the drum drives a biasing linkage that actuates the biasing member. The biasing linkage can include an actuator wheel that is positioned adjacent the drum such that the dunnage material is guided between the actuator wheel and the drum. The actuator wheel can be in mechanical connection with the biasing member such that rotation of the actuator wheel drives the biasing linkage. The biasing linkage can include an actuator arm associated with the actuator wheel. The actuator arm rotates with actuation of the biasing member. The angular rotation of the actuator arm rotates less than a full rotation while the actuator wheel is operable to continually rotate. The actuator arm is connected to the biasing member through a link member having a pivot connection at the actuator arm and a pivot connection at the biasing member causing angular rotation of the actuator arm to correspond to angular rotation of the biasing member. The biasing linkage can include the biasing linkage includes opposing actuator arms, opposing links, and opposing biasing members that each operate on opposing sides of the path of the dunnage material. In some embodiments, the actuator arm includes a slot with the ends of the slot defining a first position and a second position forming limits to the angular rotation of the actuator arm.

In accordance with various embodiments, the actuator arm can be connected to an actuator wheel through a clutch mechanism. The clutch mechanism can include a belt attached at each end to the actuator arm. The belt can wrap more than 90 degrees around the actuator wheel. The clutch mechanism allows the actuator wheel to rotate relative to the actuator arm once the arm extends to the first position. This allows the actuator wheel to rotate with the actuator arm between the first position and the second position. The clutch mechanism then allows the actuator wheel to rotate relative to the actuator arm once the arm extends to the second position. In some embodiments, the actuator wheel and the drum are connected such that they rotate together. The drum can be rotated by the drive mechanism, which in turn advances the dunnage material and rotates the actuator wheel. The conversion apparatus can also include a converting station that is configured to form dunnage out of the dunnage material prior to feeding the dunnage material through the apparatus.

In accordance with various embodiments, the biasing member deflects the material path when the biasing member is in the cutting position such that the material path forms a bend of between 15° and 90°. For example, the biasing member deflects the material path when the biasing member is in the cutting position such that the material path forms a bend of about 45°. In some embodiments, the biasing member directly forces the dunnage material against the cutting member where the dunnage material contacts the cutting member when the biasing member is in the cutting position. Alternatively, there is no contact between the biasing member and the dunnage material where the dunnage material contacts the cutting member but there is contact between the biasing member and the dunnage material downstream of the cutting member when the biasing member is in the cutting position.

In accordance with various embodiments, a conversion apparatus is provided herein. For example, the conversion apparatus for processing a dunnage material along a path can include a cutting member with an edge suitable for cutting or tearing the dunnage material. The conversion apparatus can also include a biasing member positioned adjacent to the cutting member such that the dunnage material passes between the biasing member and the cutting member. The biasing member is movable between a dispensing position and a cutting position relative to the cutting mechanism such that the biasing member is operable to bend the dunnage material around the edge of the cutting member in the cutting position. A cutting member can include an edge suitable for cutting or tearing the dunnage material. A biasing member can be positioned adjacent to the cutting member such that the dunnage material passes between the biasing member and the cutting member. The biasing member is movable relative to the cutting mechanism between a dispensing position configured to allow the dunnage material to exit from the apparatus and a cutting position that bends the dunnage material around the edge of the cutting member in the cutting position to cause the cutting member to sever the dunnage material.

As in other embodiments, the conversion apparatus can also include a driving mechanism that drives the dunnage material in a dispensing direction causing the dunnage material to be dispensed and in a reverse direction opposite the dispensing direction along the path. In response to the driving mechanism driving the dunnage material in the reverse direction, the biasing member is moved into the cutting position and biases the dunnage material around the edge and in response to the driving mechanism driving the stock in a dispensing direction the biasing member is moved into the dispensing position away from the cutting member such that the dunnage material is not biased around the edge of the cutting member.

The conversion apparatus can also include a drum that is rotated by the drive mechanism and contacts the dunnage material to advance the dunnage material in the first direction and retract the dunnage material in the second direction within the apparatus, wherein the drum drives a biasing linkage that actuates the biasing member by rotating an actuator arm that is connected through a friction connection with an actuator wheel that is driven by at least one of the drum or a pinch wheel opposing the drum.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The drawing figures depict one or more implementations in accordance with the present concepts, by way of example only, not by way of limitations. In the figures, like reference numerals refer to the same or similar elements.

DETAILED DESCRIPTION

An apparatus for converting a stock material into dunnage is disclosed. More particularly, the conversion apparatus including a mechanism for cutting or assisting the cutting of the dunnage material at desired lengths is disclosed. The present disclosure is generally applicable to systems and apparatus where supply material, such as a stock material, is processed. The stock material may be stored in a roll (whether drawn from inside or outside the roll), a wind, a fan-folded source, or any other form. The stock material may be continuous or perforated. The conversion apparatus is operable to drive the stock material in a first direction, which can be a dispensing direction. The conversion apparatus is fed the stock material from the repository through a drum in a dispensing direction. The stock material can be any type of protective packaging material including other dunnage and void fill materials, inflatable packaging pillows, etc. Some embodiments use supplies of other paper or fiber-based materials in sheet form, and some embodiments use supplies of wound fiber material such as ropes or thread, and thermoplastic materials such as a web of plastic material usable to form pillow packaging material.

The conversion apparatus is used with a cutting mechanism operable to sever the dunnage material. In some embodiments, the cutting mechanism is used with no or limited user interaction. For example, the cutting mechanism punctures, cuts, or severs the dunnage material without the user touching the dunnage material or with only minor contact of the dunnage material by the user. Specifically, a biasing member is used to bias the dunnage material against or around a cutting member to improve the ability of the system to sever the dunnage material. The biased position of the dunnage material is used in connection with or separately from other cutting features such as reversing the direction of travel of the dunnage material.

With reference to FIGS. 1A, 1B, 7, 8A and 8B, a dunnage conversion system 10 is disclosed for processing a stock material 21. Covers, guards, external elements, etc., may be removed from the various views shown to provide clarity to the structure discussed herein. For example, FIG. 1 illustrates drum guide 233, which is omitted from the other figures for clarity.

Figure 1A:
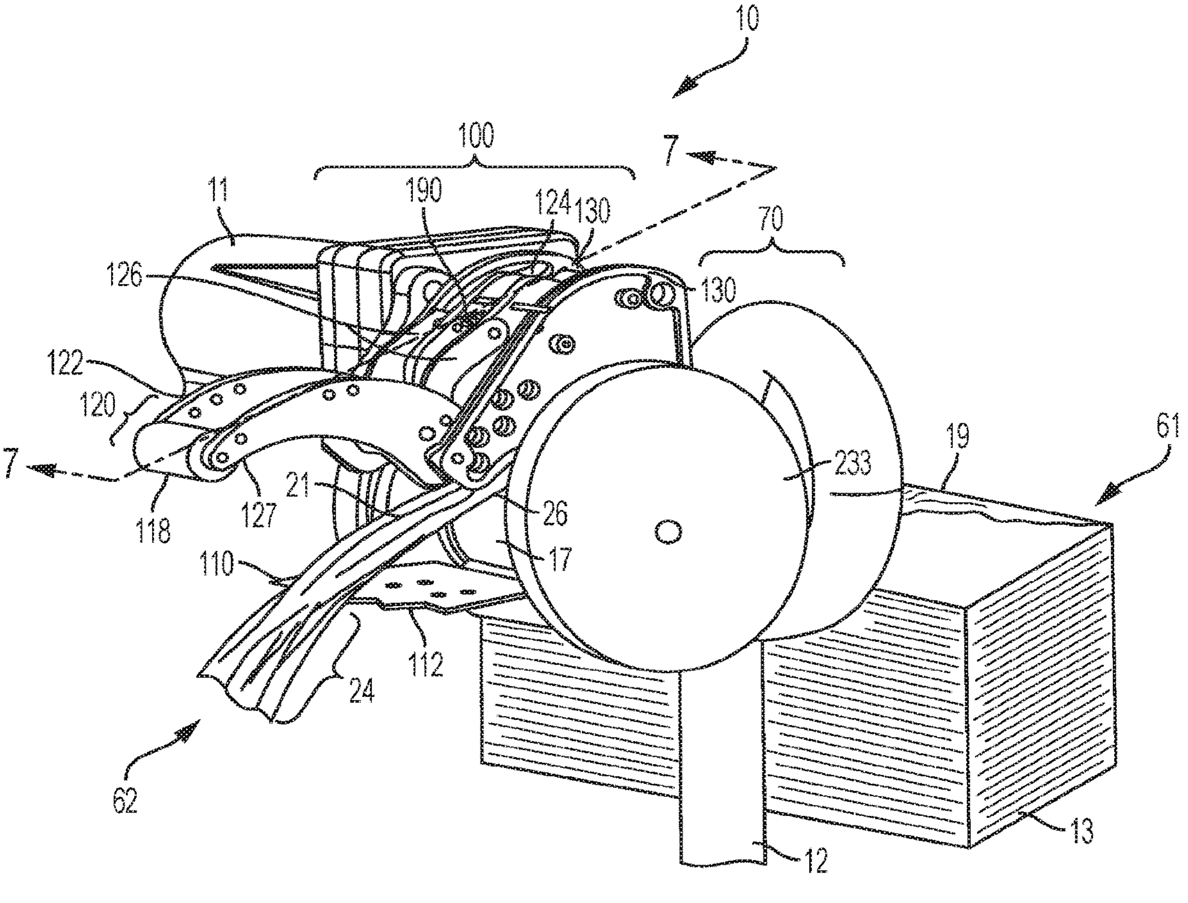
FIG. 1A is a perspective view of an embodiment of a conversion apparatus and supply station in a first position.

In accordance with various embodiments, the dunnage conversion system 10 includes the conversion station 70 and a cutting mechanism 100. The cutting mechanism 100 includes a biasing apparatus 120 operable to bias the dunnage material 21 against a cutting member 110. The cutting mechanism 100 assists a user in cutting or severing material at a desired point. The dunnage material 19 is converted from stock material 19, which is itself delivered from a bulk material supply 61 and delivered to the conversion station for converting to dunnage material 21 and then to the cutting mechanism. In one example, as shown in FIG. 1A, the bulk material supply is stacked bales of fan-fold material. However, as indicated above, any other type of supply or stock material may be used. The stock material 19 is fed from the supply side 61 of the converting station 70. The stock material 19 is converted by the converting station 70 and then dispensed in a dispensing direction A on the out-feed side 62 of the converting station 70. The stock material 19 includes continuous or semi-continuous lengths of sheet material that are converted into dunnage material 21. Multiple lengths can be daisy-chained together.

In various embodiments, dunnage conversion system 10 is configured to pull a stream of stock material 19 from a supply station 13 and into a converting station 70, where the converting station 70 converts the high-density configuration of stock material 19 into a low-density configuration of dunnage material 21. The material can be converted by crumpling, folding, flattening, or other similar methods that convert high-density configuration to a low-density configuration. Further, it is appreciated that various structures of the converting station 70 can be used, such as those converting stations 70 disclosed in U.S. Pat. Pub. No. 2013/0092716, U.S. Publication 2012/0165172, U.S. Publication No 2011/0052875, and U.S. Pat. No. 8,016,735.

In one configuration, the dunnage conversion system 10 can include a support portion 12 for supporting the station. In one example, the support portion 12 includes an inlet guide for guiding the sheet material into the dunnage conversion system 10. The support portion 12 and the inlet guide are shown combined into a single rolled or bent elongated element forming a support pole or post. In this particular embodiment, the elongated element is a tube having a round pipe-like cross-section. Other cross-sections may be provided. In the embodiment shown, the elongated element has an outer diameter of approximately 1½". In other embodiments, the diameter ranges from approximately ¾" to approximately 3" or from approximately 1" to approximately 2". Other diameters outside the range provided may also be used. The elongated element extends from a floor base configured to provide lateral stability to the converting station. In one configuration, the inlet guide 12 is a tubular member that also functions as a support member for the system. In embodiments where a tube is provided, it can be bent around that central axis such that the longitudinal axis is bent from about 250° to about 300° to form a loop through which the stock material is fed. Other inlet guide designs such as spindles may be used as well.

Figure 9:
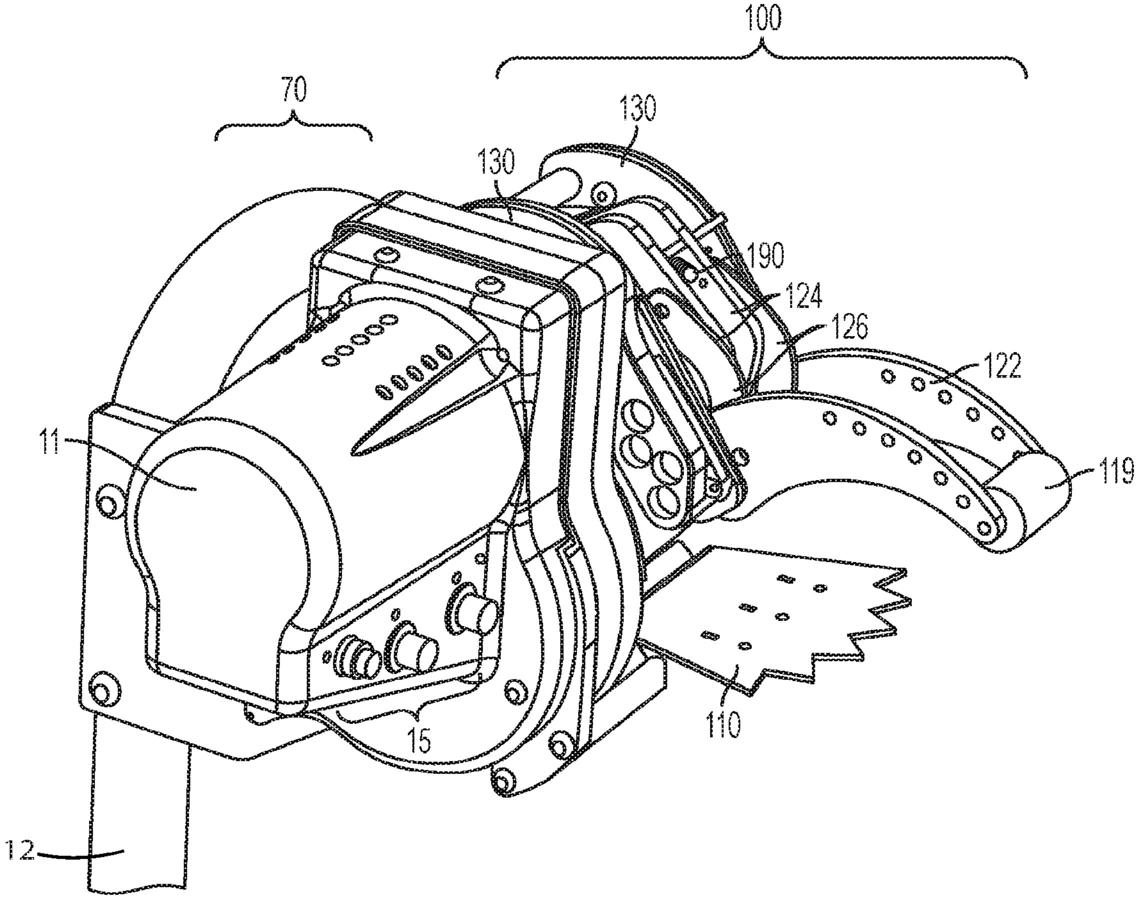
FIG. 9 is a perspective view of an embodiment of a conversion apparatus showing the drive and control mechanism.

The dunnage conversion system 10 includes an advancement mechanism for driving the stock/dunnage material. In accordance with various embodiments, the advancement mechanism is an electromechanical drive such as an electric motor 11 or similar motive device. The motor 11 is connected to a power source, such as an outlet via a power cord, and is arranged and configured for driving the dunnage conversion system 10. The motor 11 is an electric motor in which the operation is controlled by a user of the system, for example, by a foot pedal, a switch, a button, or the like. (See, e.g., controls 15 in FIG. 9) In various embodiments, the motor 11 is part of a drive portion, and the drive portion includes a transmission for transferring power from the motor 11. Alternatively, a direct drive is used. The motor 11 is arranged in a housing and is secured to a first side of the central housing, and a transmission is contained within the central housing and operably connected to a drive shaft of the motor 11 and a drive portion, thereby transferring motor 11 power. Other suitable powering arrangements can be used.

The motor 11 is mechanically connected either directly or via a transmission to a drum 17, shown in FIGS. 1A, 1B, 7, 8A and 8B, which causes the drum 17 to rotate with the motor 11. During operation, the motor 11 drives the drum 17 in either a dispensing direction or a reverse direction (i.e., opposite of the dispensing direction), which causes drum 17 to dispense the dunnage material 21 by driving it in the dispensing direction, depicted as arrows "A" in FIGS. 1A, 1B, 7, 8A and 8B, or withdraw the dunnage material 21 back into the conversion machine in the direction opposite of A. The stock material 19 is fed from the supply side 61 of the converting station 70 and over the drum 17, forming the dunnage material 21 that is driven in the dispensing direction "A" when the motor 11 is in operation. While described herein as a drum, this element of the driving mechanism may also be wheels, conveyors, belts or any other device operable to advance stock material or dunnage material through the system.

In accordance with various embodiments, the dunnage conversion system 10 includes a pinch portion operable to press on the stock material 19 as it passes through the pinch portion. As an example, the pinch portion includes a pinch member such as a wheel, roller, sled, belt, multiple elements, or other similar member. In one example, the pinch portion includes a pinch wheel 14. The pinch wheel 14 is supported via a bearing or other low friction device positioned on an axis shaft arranged along the axis of the pinch wheel 14. In some embodiments, the pinch wheel can be powered and driven. The pinch wheel 14 is positioned adjacent to the drum such that the material passes between the pinch wheel 14 and the drum 17. In various examples, the pinch wheel 14 has a circumferential pressing surface arranged adjacent to or in tangential contact with the surface of the drum 17. The pinch wheel 14 may have any size, shape, or configuration. Examples of size, shape, and configuration of the pinch wheel may include those described in U.S. Pat. Pub. No. 2013/0092716 for the press wheels. In the examples shown, the pinch wheel 14 is engaged in a position biased against the drum 17 for engaging and crushing the stock material 19 passing between the pinch wheel 14 and the drum 17 to convert the stock material 19 into dunnage material 21. The drum 17 or the pinch wheel 14 is connected to the motor 11 via a transmission (e.g., a belt drive or the like). The motor 11 causes the drum or the pinch wheel to rotate.

The cutting mechanism controls the incoming dunnage material 19 in any suitable manner to advance it from a conversion device to the cutting member. For example, the pinch wheel 14 is configured to control the incoming stock material. When the high-speed incoming stock material diverges from the longitudinal direction, portions of the stock material contacts an exposed surface of the pinch wheels, which pulls the diverging portion down onto the drum and help crush and crease the resulting bunching material. The dunnage may be formed in accordance with any techniques including ones referenced to herein or ones known such as those disclosed in U.S. Pat. Pub. No. 2013/0092716.

In accordance with various embodiments, the conversion apparatus 10 is operable to change the direction of the stock material 19 as it moves within the conversion apparatus 10. For example, the stock material is moved by a combination of the motor 11 and drum 17 in a forward direction (i.e., from the inlet side to the dispensing side) or a reverse direction (i.e., from the dispensing side to the supply side 61 or direction opposite the dispensing direction). This ability to change direction allows the cutting mechanism 100 to cut the dunnage material more easily by pulling the dunnage material 19 directly against an edge 112 of cutting member 110. As the stock material 19 is fed through the system along the material path "B", the drum 17 rotates in a converting, direction (depicted as direction "C") and dunnage material 21 passes over or near a cutting member 110 without being cut.

Various embodiments of the cutting mechanism 100, as illustrated FIGS. 1A, 1B, 7, 8A, and 8B, include a biasing apparatus 120 that includes a biasing member 122 that is located adjacent to the cutting member 110. The biasing member 122 and the cutting member 110 are positioned adjacent to one another downstream of, and preferable at a position proximal to, the portion of the dunnage conversion system 10 from which the dunnage material is dispensed.

The biasing member 122 and the cutting member 110 are typically positioned on opposite sides of the formed dunnage 19 in the path. The dunnage material can thus pass between the biasing member 122 and the cutting member 110. The biasing member 122 shown can contact the dunnage material 21, thereby biasing the dunnage material 21 towards and preferably against the cutting member 110. The position of the biasing member 122 relative to the cutting member 110 is preferably such that the cutting member begins to sever or fully severs the dunnage material 21 in response to the dunnage material 21 being retracted back into the conversion apparatus 10. In various embodiments, the dunnage material 21 is not positioned against the cutting member 110 in the dispensing direction "A", but in the reverse direction, the dunnage material 21 is forced against the cutting member 110 due to either one of or both the relative positions of the cutting member 110 or the biasing member 122. In other embodiments, the dunnage material 21 is generally positioned against or proximal to the cutting member 110. In one example, an end 24 of the biasing member 122 extends downstream of the edge 112 of the cutting member 110. The backward retraction of the dunnage material 19 is preferably performed by operating the drum 17 in reverse (i.e., the oppose direction of "C"), but it can also or alternatively be accomplished alternatively by another member. The end 228 contacting the dunnage material 21 causes the dunnage material 21 to bend or wrap around the end of the edge 112. In this manner, as the dunnage material 21 is retracted back into the conversion apparatus 10, the dunnage material 21 is pulled directly against the edge 112.

The position of the biasing member 122 relative to the cutting member 110 is preferably such that the cutting member 110 starts to sever the dunnage material in response to the dunnage material 21 traveling in the dispensing direction. In one example, the biasing member 122 is positioned relative to the edge such that, in the dispensing direction, there is insufficient interaction between the dunnage material 21 and the edge 112 to cause any severing of the dunnage material. In some embodiments, when the dunnage material is dispensed in the dispensing direction, the biasing member moves away from the blade and from the material.

Figure 1B:
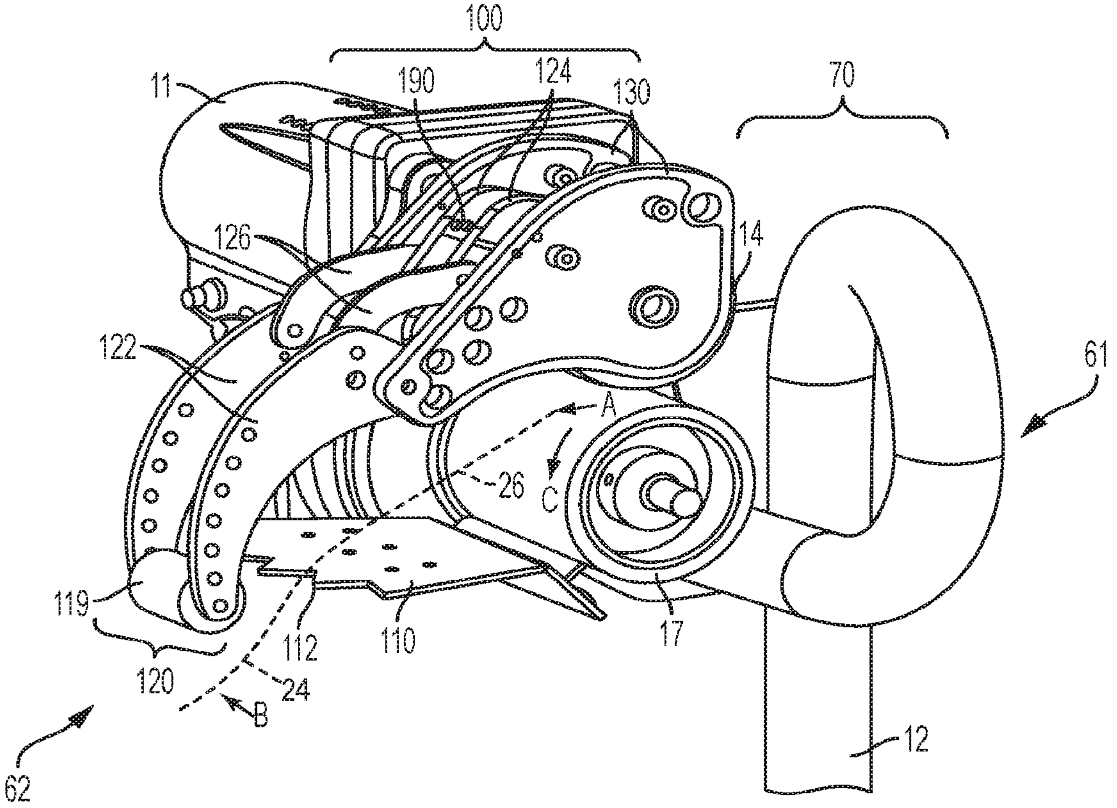
FIG. 1B is a perspective view of an embodiment of a conversion apparatus and supply station in a second position.
Figure 8A:
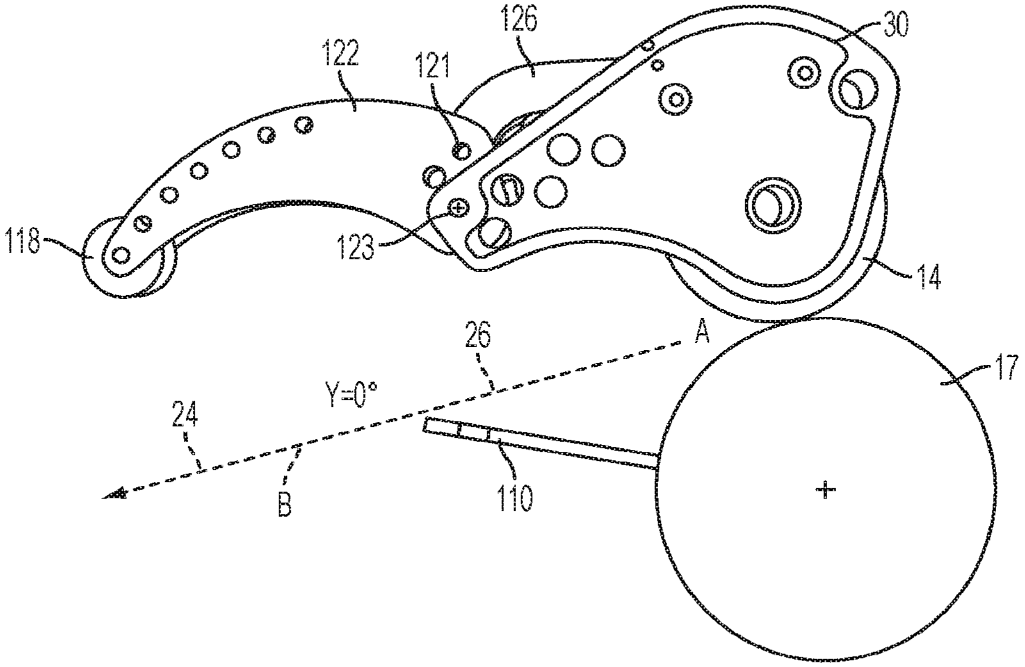
FIG. 8A is a side view of a conversion apparatus with the cutting mechanism in a first position.
Figure 8B:
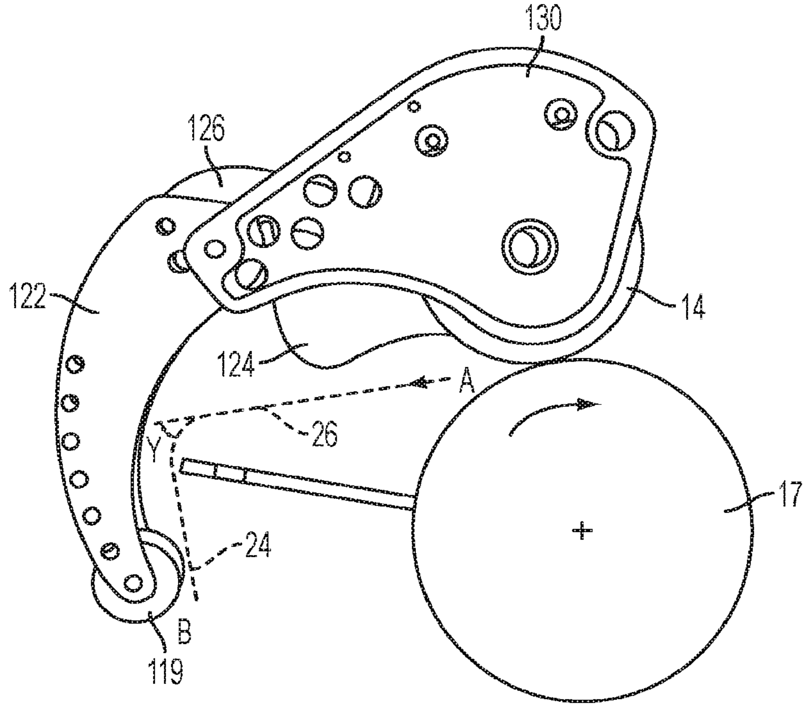
FIG. 8B is a side view of a conversion apparatus with the cutting mechanism in a second position.

In the embodiment shown in FIGS. 1B and 8B, the biasing member 122 is in a cutting position and or moves with respect to the cutting member 110 such that, in the reverse direction there is sufficient interaction between the dunnage material 21 and the edge 112 to cause puncturing, cutting, severing, tearing or the like to the dunnage material. The biasing member 122 contacts the dunnage material 21 downstream of the cutting member 110. This contact point can be any portion of the biasing member including for example, the distal end 228 or intermediate portions. In various embodiments, the position of the biasing member 122 downstream of the cutting member 110 causes the path A-B to have an elbow proximate to the cutting member. As the material flows in the dispensing direction the material naturally pushes itself away from the cutting member at the elbow. More specifically, a concave side of the elbow is proximate to the cutting member 110 and when the material is dispensed in the dispensing direction the concave side of the elbow is moved away from the cutting member 110. In the reverse direction, however, the material pulls itself back into the cutting member at the elbow. More specifically, the concave side of the elbow is pulled into contact with the cutting member 110. In various examples the elbow is where the dunnage material bends around the edge 112 of the cutting member 110. The bend caused by the relationship of the biasing member 122 and the cutting member 110 includes any deflection of the material that allows the material to be cut when the material is driven in the reverse direction. While it is understood that some bend might be formed in the material due to the weight of the material around the cutting member, the angles discussed herein are with regard to the change in angle or the path change caused by the biasing member 122. For example, a straight path or an uninterrupted path of dunnage material would have a 0° angle Y (See FIG. 8A) at the cutting member contact. A slight deflection would cause the angle Y to be greater than 0° (See FIG. 8B). Measuring in this way, in one embodiment, the bend of the dunnage material 21 around the cutting member 110 is at least about 15°; preferably, the bend is at least about 45°; or more preferably the bend is at least about 90°.

In some embodiments, the biasing member 122 directly forces the dunnage material against the cutting member 110 where the dunnage material and the cutting member contact one another when the biasing member is in the cutting position. Alternatively, there is no contact between the biasing member 122 and the dunnage material where the dunnage material contacts the cutting member 110 but there is contact between the biasing member 122 and the dunnage material downstream of the cutting member 110 when the biasing member is in the cutting position.

In accordance with one embodiment, the positions of the biasing member 122 and the cutting member 110 are configured such that the contact is not sufficient to sever the dunnage material 21 but merely begin to tear it or perforate it. In other embodiments, the positions are configured such that the contact is sufficient to cause the edge 112 to catch and begin cutting or tearing the material. In other embodiments, the positions are configured such that the contact is sufficient to cause the edge 112 to fully sever the dunnage material. Additionally or alternatively, the biasing member 122 is selectively movable between different positions so that the biasing member is positionable to avoid causing any bend (i.e., a dispensing position as shown for example in FIGS. 1A and 8A) or avoid causing a bend that is sufficient to cut or perforate the material. The biasing member is also repositionable so that it causes a bend (i.e., a cutting position as shown for example in FIGS. 1B and 8B) sufficient to at least cut or perforate the material and possibly sever the material. This cutting position may be one in which the engagement between the biasing member 122 and the dunnage material 21 is sufficient to puncture, cut, or sever.

In accordance with various embodiments, the biasing member 122 allows the dunnage material to move freely at least in the longitudinal direction. While, in some embodiments the biasing member 122 places a direct force on the material 19 against the cutting member 110. The direct force is sufficient to puncture the dunnage material on the cutting member 110 but not pinch the material between the biasing member 122 and the cutting member 110. In other embodiments, the biasing member 122 contacts the dunnage material downstream of the cutting member such that there is no direct force by the biasing member 122 against the cutting member 110 but instead the material 19 is biased against the cutting member 110 because of the bend formed therein by the contact between the biasing member 122 and the material 19 downstream of the cutting member 110. As such, in various embodiments, the biasing member 122 does not pinch the material 19 against the cutting member 110, but instead merely biases the path of the material 19 such that it flows around and engages the cutting member 110.

In various examples, the biasing member 122 is movable between various positions relative to the cutting member 110 in such a way as to modify the interaction between the cutting member 110, the dunnage material 21, and the biasing member 122. For example, the biasing member 122 can be placed in a cutting position (See FIGS. 1B and 8B) or a dispensing position (See FIGS. 1A and 8A). The relative motion may occur in any manner. For example, the biasing member 122 rotates relative to the cutting member 110 such that the space and relative orientation between the two members changes. In another example, the entire biasing member 122 translates relative to the cutting member 110. In another example, the movable portion is the cutting member 110 with the biasing member being more or less stationary. In another example, a combination of any of these motions forms the interaction between the biasing member 122 and the cutting member 110. In the example shown in FIGS. 1A-3 and 7, 8A and 8B, the biasing member 122 includes a first end 226 which is disposed about a pivot axis. This pivot axis allows the biasing member 122 to rotate about the pivot axis at the first end. This rotation allows a second end 228 of the biasing member 122 to move relative to the cutting member 110. The second end of the biasing member 122 extends proximal to or beyond the edge 112 of the cutting member 110.

In accordance with various embodiments, the biasing member 122 may take any form. In one example, the biasing member 122 includes one or more structural members that in some embodiments are fingers. In some embodiments, the fingers have a narrow width relative to their length. The width is sufficiently small to fit between consecutive points of teeth or serrations on the cutting member 110. In various embodiments, the fingers 122 form the structure of the biasing member 122 having the first end 226 and the second end 228. The first end 226 is operable to connect to the conversion device 10 in a fixed position or a movable position. For example, the first end 226 has a pivot axis 123 which rotates about the same axis through a locating feature 131 on the housing 130. The pivot axis 123 defines the center of an aperture that receives the locating feature 131, which, for example, is a protrusion extending from a wall of the housing 130. The biasing member 122 may have additional locating features operable to connect the biasing member 122 with one or more other elements of the biasing apparatus 120. For example, the biasing member 122 includes a plurality of apertures 121 positioned along its length that are operable to connect with an actuator arm 124 or link arm 126. The plurality of apertures allow for the mechanical advantage extended to the biasing member to be adjusted by connecting the biasing member at different lengths from the pivot axis 123.

In various embodiments, the biasing member 122 is a support structure to support an area configured to contact the material 19. The contact area is located on the distal end of the biasing member 122. In one example, the contact area is a roller 119 that contacts the material 19 and rolls allowing for the material 19 to easily glide past the biasing member 122. In various embodiments, other parts of the biasing member 122 may also contact the material 19.

In one embodiment, each finger making up the biasing member 122 is a curved plate defined by converging curved sidewalls 222, 224. In this way, a first end of the biasing member is wider than the second end. The biasing member 122 is sufficiently long to extend to or past the cutting member 110 such that the biasing member 122 would contact the biasing member 122 along its length as opposed to its second end. In some embodiments, the second end 228 also includes the roller 119, which can connect adjacent fingers together. The roller allows the dunnage material 21 to flow past the end of the fingers 122 with lower friction, reducing the likelihood of the dunnage material 21 jamming between the fingers 122. The fingers may contact material proximal to the cutting member 110 and or the roller 119 may contact material downstream of cutting member 110. Adjustable pivots 223 for roller 119 are provided along the length of the biasing member 122.

Preferably, the cutting member 110 can be curved or directed downward so as to provide a guide that deflects the material in the out-feed segment 26 of the path as it exits the system over the cutting member 110 and potentially around the edge 112. Preferably, the cutting member 110 is curved at an angle similar to the curve of the drum 17, but other curvature angles could be used. It should be noted that the cutting member 110 is not limited to cutting the material using a sharp blade, but it can include a member that causes breaking, tearing, slicing, or other methods of severing the dunnage material 21. The cutting member 110 can also be configured to fully or partially sever the dunnage material 21.

Figure 2:
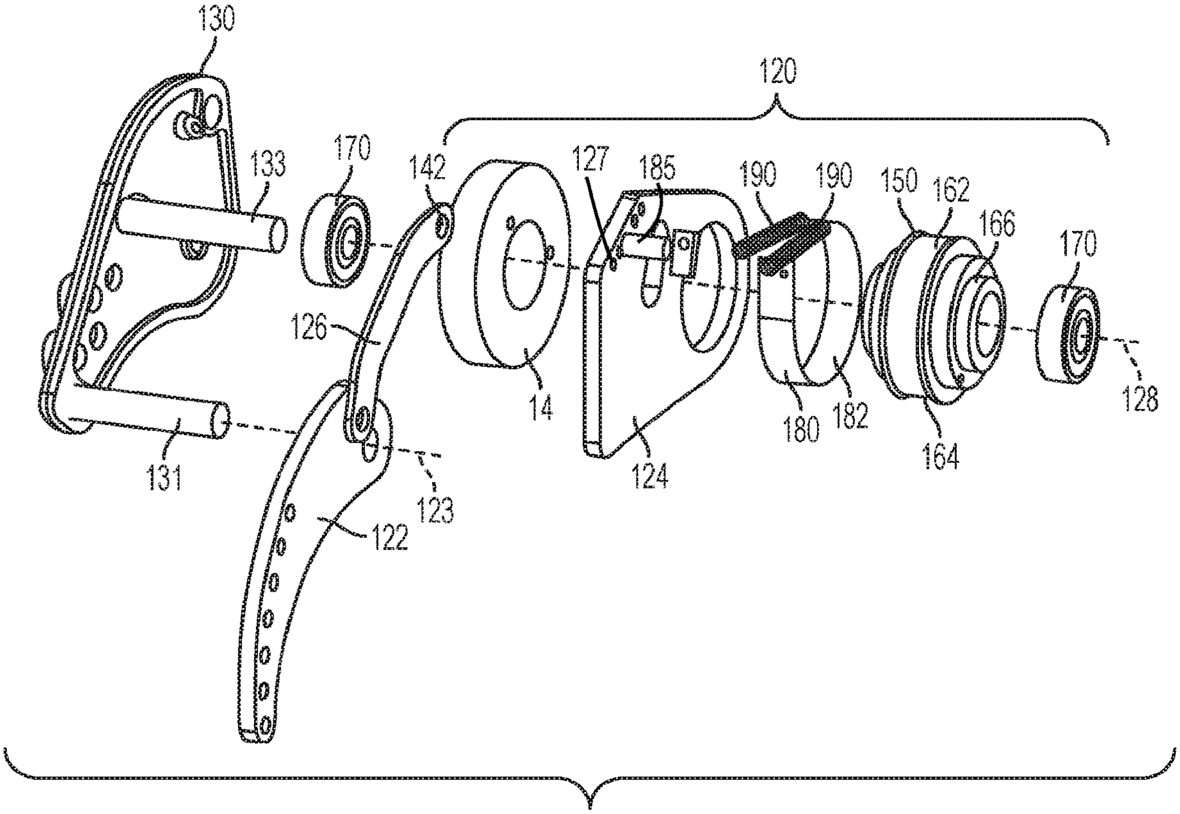
FIG. 2 is a partial exploded view of an embodiment of a cutting apparatus utilized in the conversion apparatus of FIG. 1A.
Figure 3:
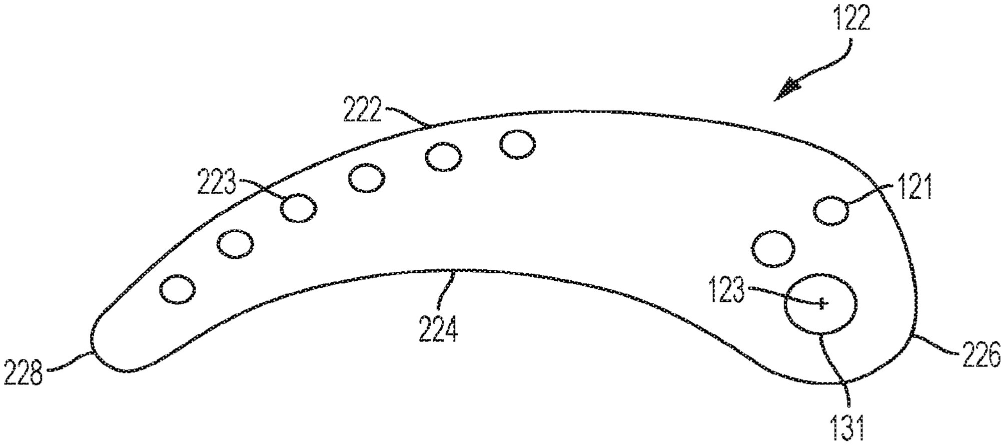
FIG. 3 is a side view of a biasing member illustrated in FIG. 2.

Preferably, the tearing mechanism comprises a single cutting member 110 that engages the dunnage material 21. The cutting member 110 can be disposed on a single lateral side of the material path. In the preferred embodiment, it is disposed below the drum 17 and substantially along the material path. As shown in FIG. 2, the transverse width of the cutting member 110 is preferably about at most the width of the drum 17. In other embodiments, the cutting member 110 can have a width that is less than the width of the drum 17 or greater than the width of the drum 17. In one embodiment, the cutting member 110 is fixed; however, it is appreciated that in other embodiments, the cutting member 110 could be moveable or pivotable.

Figure 4:
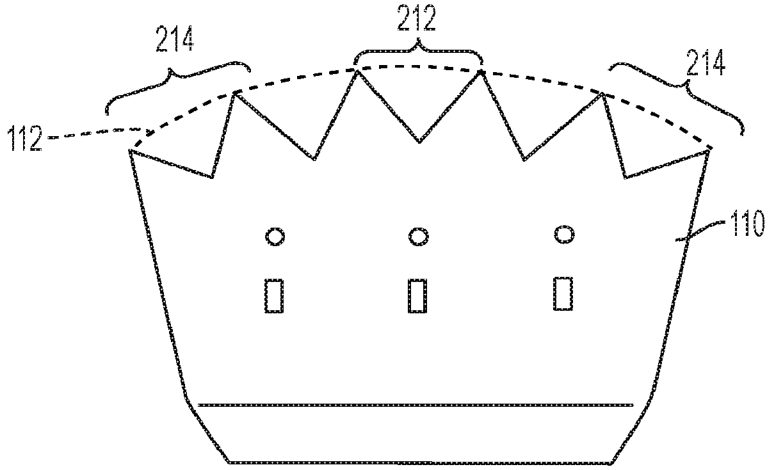
FIG. 4 is a front view of a cutting member illustrated in FIG. 2.

As shown in FIG. 4, the edge 112 is positioned at the leading end of the cutting member 110, which is oriented away from the driving portion. The edge 112 is preferably configured sufficient to engage the dunnage material 21 when the dunnage material 21 is drawn in reverse, as described below. The edge 112 can comprise a sharp or blunted edge having a toothed or smooth configuration, and in other embodiments, the edge 112 can have a serrated edge with many teeth, an edge with shallow teeth, or other useful configuration. A plurality of teeth is defined by having points separated by troughs positioned there between.

In various embodiments, the edge 112 has a shape defining its cutting edge profile that is formed such that contact with the dunnage material 21 does not occur uniformly across the edge of the cutting member 110 but instead occurs first at a leading portion 212 of the edge 112 and then at trailing portions 214 of the edge 112 as the leading portion cuts through the dunnage material. In one example the edges are straight with a leading point that tapers back toward the conversion machine to the lateral edges of the cutting member. In another example, the edge 112 could form a curvilinear path at the end of the cutting member that contacts the dunnage material. In one embodiment, the curved shape is convex in shape having a central portion as the leading portion. Alternatively, the curved shape is concave in shape having lateral portions as the leading portions. In various embodiments, the curved shape of the edge 112 includes the teeth discussed above as well. The separation of each of the teeth is such that it is a multiple of the distance between respective portions (e.g., fingers) of the biasing apparatus 120. Such a relationship allows the biasing fingers 122 of the biasing apparatus 120 to engage the cutting member 110 within the troughs between the separate teeth. In this way, the biasing fingers 122 force the dunnage material 21 into the teeth and past the teeth, such that the teeth are forced to cut through the dunnage material 21. Other embodiments of the biasing member 122, in which the member is not a finger, may likewise force the dunnage material 21 past the profile edge 112 of the cutting member 110. For example, the biasing member 122 includes a groove that receives the cutting member 110. Alternatively, the biasing member 122 is formed of a soft material that engages the cutting member 110, thereby forcing the dunnage material around and past the edge 112.

In other embodiments of the cutting member 110, the member can be a bar having no typical characteristics of a cutting device. The bar may sufficiently engage the dunnage material 21 with the biasing member such that both the force of the user pulling in one direction and the force of the biasing member pinching the dunnage material with the bar partially or fully tears the dunnage material 21. Thus, a cutting member does not need to be present. For example, where the dunnage material is perforated or where the biasing member provides a sufficient force to pinch the dunnage material with a stationary member (e.g., the bar), the cutting mechanism can function as a tearing mechanism that is operable to sever the dunnage material at the perforation or the pinched location.

The biasing member 122 may be positioned and or actuated in accordance with any of a variety of methods. In one example, the biasing member 122 is supported by a housing 130. In various embodiments, the housing movably supports the biasing member 122 such as by pivot 132. In other embodiments, the housing 130 fixedly supports the biasing member 122 such that it maintains a consistent position relative to the cutting member 110. In various examples, the biasing apparatus 120 is actuated by the drive mechanism as the drive mechanism advances the dunnage material 21 through the system. In another example, the biasing apparatus 120 is actuated by its own dedicated actuator, such as a biasing motor, linear drive, or other mechanical or electromechanical actuator that is separate from the drive motor 11.

Figure 5:
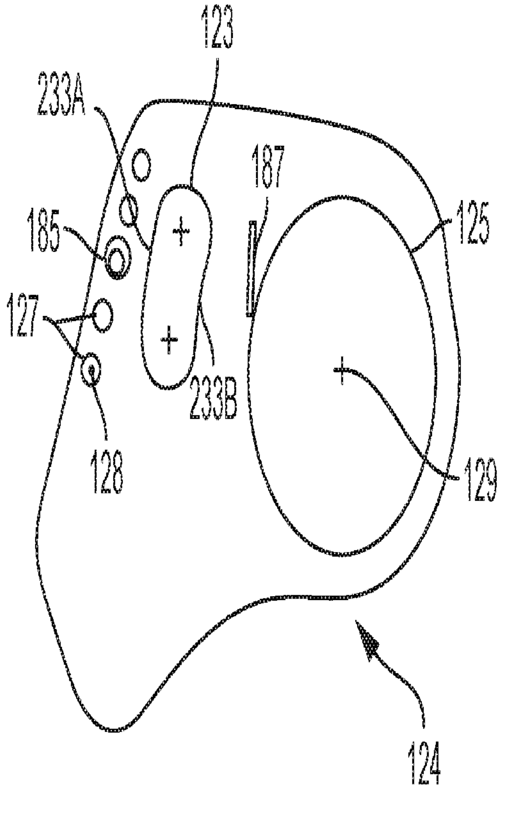
FIG. 5 is a side view of an actuator arm illustrated in FIG. 2.

FIG. 2 illustrates a partial exploded view of the conversion mechanism 10 showing an embodiment and relationship of some elements but excluding some of the counterpart elements that would be present in such an embodiment on their opposite side. As shown in the embodiment of FIG. 2, the biasing member 122 is connected to the drive mechanism 11 via the biasing apparatus 120. The drive mechanism 11 transmits torque from the motor through the drum 17 and into the actuator arm 124. This may also be transmitted through the pinch wheel 14. The actuator arm 124 is connected to the drum 17 and or the pinch wheel 14 via an actuator wheel 150. As illustrated in FIGS. 2 and 5, the actuator arm 124 includes a plurality of pivot axes such as axes 128 and 129. Each of these pivot axes (e.g., 128, 129) are associated with a connection feature such as an aperture or stud that is operable to connect to other elements of the biasing apparatus 120. For example, the actuator arm includes an aperture 125 located at the pivot axes 129. This aperture 125 aligns along axis 129 which passes through the actuator wheel 150, various support bearings 170, and or pinch wheel 14. The actuator arm 124 includes another aperture 123 operable to define the range of rotational motion of the actuator arm. The aperture 123 receives a locating feature 133 from the housing 130 such that as the actuator arm 124 rotates, the locating feature 133 contacts ends of the aperture 123, preventing or limiting further rotation of the actuator arm. For example, as illustrated in FIG. 5, the aperture 123 is an arcuate slot. The slot 123 may be defined by two radial ends having an axis. The radial ends can then be connected by straight or curved walls 223A, 223B. In some embodiments, the path of the slot 123 can be concentric with axes 129. The ends of the slot define the extent to which the actuator arm 124 can rotate. In various embodiments, the actuator arm 124 connects directly to the biasing member 122; in other embodiments, it connects indirectly through a link arm 126. For example, the pivot axis 128 defines the center of each mounting location 127 for mounting fixture 185 which aligns with aperture 142 of the link arm 126.

In accordance with other embodiments, the biasing member 122 is actuated in a simpler manner by single pivot. Alternatively, the biasing member 122 is also be actuated a multiple pivots in complex linkage system. In another alternative, the biasing member 122 does not rotate at all but is a part of a linear actuator with the biasing member 122 following a linear or varied path. While the example shown herein is one in which the biasing member 122 is actuated by the motor 11, it is appreciated that any actuator located in any position may similarly actuate the biasing member 122. For example, the biasing member 122 is attached from below the cutting member with an actuator that extends below or with a different system than the one that advances the dunnage material 21. As indicated above, in some embodiments, the biasing member does not move at all but is instead stationary providing a constant pressure in such a way that the material 19 is not cut, perforated or severed when being dispensed, but is only severed when reversed back into the device.

In accordance with various embodiments, the actuator arm 124 moves semi independently of the drum 17. While the drum 17 provides a force to move the actuator arm 124 this force is controlled such that there is not a direct proportional relationship between movement of the actuator arm 124 and the drum 17 and or the pinch wheel 14. For example, as the drum 17 and or the pinch wheel 14 continuously rotates in either direction, the actuator arm 124 rotates in the same direction as the pinch wheel 14 and or the drum 17 until it reaches the end of its range of travel at which point the actuator arm 124 slips relative to the drum 17 and or the pinch wheel 14. As shown by way of example in FIG. 2, the actuator arm is connected to the pinch wheel 14 via the actuator wheel 150. This connection is operable to slip once the actuator arm 124 reaches its end of travel. For example, the connection includes an interface that is operable to engage the actuator arm 124 and the pinch wheel 14 throughout the range of travel but allow the connection to disengage or slip once the end of travel is reached. For example, as shown in FIG. 2, this interface is accomplished by providing a clutch 180 between the actuator arm 124 and the actuator wheel 150. As such, as illustrated in FIG. 5, the actuator arm 124 also includes mounting features 185, 187 for the clutch. In this embodiment, one mounting feature 185 is adjustable between a plurality of mounting locations 127. The mounting locations can be apertures that receive a standoff 185. The other mounting feature 187 can be fixed. The features connect to the clutch in other suitable manners. For example, one or both are apertures designed to receive a fastener from the clutch 180 or one or both are protrusions designed to receive the clutch 180 directly. The features 185, 187 also include both protrusions and apertures to contact the clutch 180 directly and then receive fastening hardware through the respective apertures as shown in FIG. 2.

Figure 6:
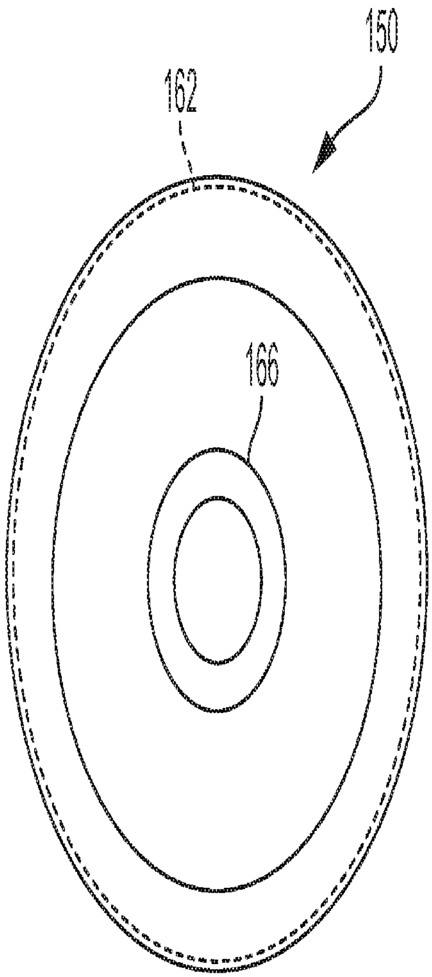
FIG. 6 is a side view of an actuator wheel illustrated in FIG. 2.

As illustrated in the embodiment of FIG. 6, the actuator wheel 160 is cylindrical having a friction surface 162 extending around its perimeter 164. The friction surface 162 contacts a clutch 180. The clutch 180 is, as an example, a belt-type clutch as shown in FIG. 2. The friction surface 182 of the belt contacts the friction surface 162 of actuator wheel 160. The belt wraps around the actuator wheel 160 more than 180 degrees. In one example, the belt wraps around the actuator wheel about 270 degrees. The clutch 180, in this example, is anchored on each end by attaching to the actuator arm 124. One end of the clutch 180 is anchored with a spring mechanism 190. The springs are positioned such that as the pinch wheel rotates to advance the dunnage material 21 out of the device, the spring mechanism 190 has a tendency to lengthen, which in turn reduces the force of the clutch 180 against the friction surface 162 allowing for greater slip between the clutch 180 and the actuator wheel 160. With the clutch attached to the actuator arm 124, this greater slip translates to a reduced force on the actuator arm 124 allowing it to stop at the end of its range of motion while the actuator wheel and or the pinch wheel 14 continues to rotate. In the opposite direction, i.e. rotating the pinch wheel 14 such that the dunnage material 21 is retracted back into the device, the spring mechanism 190 shortens, thereby shortening the clutch belt 180 and increasing the frictional force between the belt and the friction surface 162. This increase in force drives the actuator arm 124 to engage the biasing member 122 against the cutting member 110 with less slippage (and greater force from the actuator arm) than the opposite direction. This action may puncture, cut, or sever the dunnage material 21. Hub portions 166 extend from the sides of the actuator wheel. The hub portions 166 are operable to engage bearings 170, the pinch wheel 14, the actuator arm 124, and or portions of the housing 130.

Figure 7:
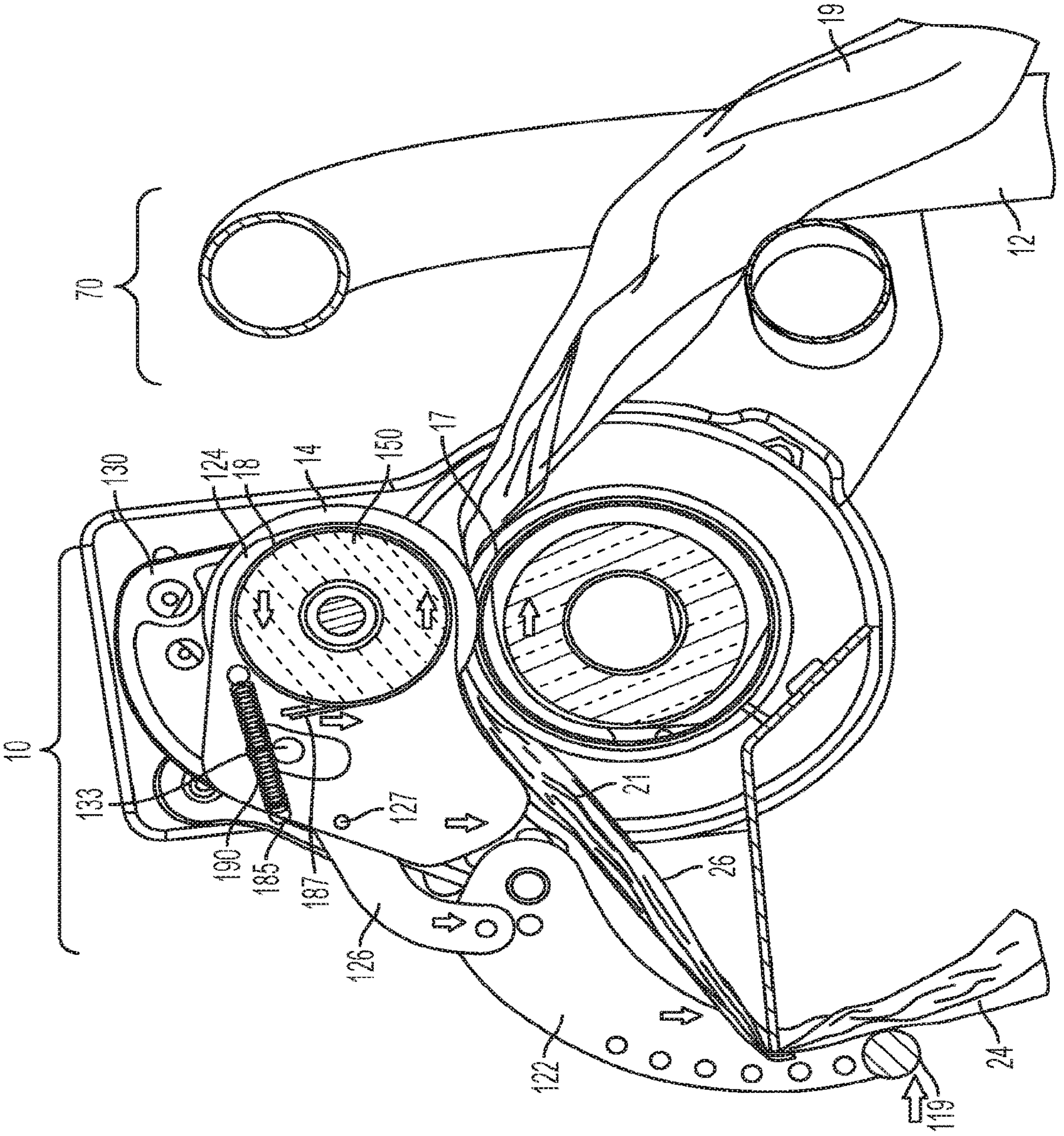
FIG. 7 is a cross-sectional side view of a conversion apparatus with the cutting mechanism in a second position.

In accordance with various embodiments and shown in FIGS. 7, 8A and 8B, in operation, the user feeds a desired length of the dunnage material 21 at the supply side 60 of the converting station 70, which is then moved in a dispensing direction by the operation of the motor 11 and dispensed at the out-feed side 62. The drum 17 turns in coordination therewith, and the dunnage material 21 is fed out of the machine. Running the motor in this dispensing direction biases the actuator arm 124 in a dispensing position causing the biasing member 122 to be disengaged from the cutting member 110. This state is maintained until a desired length has been reached. At this point, the motor 11 is reversed and dispensing movement of the dunnage material 21 stops and retracting of the dunnage material 21 begins. Running the motor in the reverse direction causes actuator arm 124 to rotate to a cutting position causing the biasing member 122 to engage the dunnage material 21. At the same time, the dunnage material 21 is being retracted into the device it is bent around the cutting member 110 via the relative positions of the cutting member 110 and the biasing member 122. This may puncture, cut or sever the dunnage material 21, allowing the user to remove the dunnage material 21 more easily.

Generally, the dunnage material 21 follows a material path A-B as shown in FIGS. 1B, 8A and 8B. As discussed above, the material path A-B has a direction in which the material 19 is moved through the system. The material path A-B has various segments such as the feed segment from the supply side 61, out-feed segment 26, and severable segment 24. The dunnage material 21 on the out-feed side 62 substantially follows the path A until it reaches the edge 112. The edge 112 provides a cutting location at which the dunnage material 21 is severed. The material path B can be bent over the edge 112. The dunnage material 21 on the out-feed side of the converting station 70 can be broken into two portions at the point in which the material path B is bent at the edge 112: an out-feed segment 26 that is disposed between the drum 17 and cutting member 110 and a severable segment 24 that is disposed beyond the cutting member 110.

As indicated above, the motor is run in a first direction, dispensing the dunnage, until a desired length is reached. At such a point the motor is reversed. In some embodiments, the biasing apparatus 120 is actuated mechanically in direct response to the change of direction of the motor as discussed above. In other embodiments, the biasing apparatus 120 is actuated via a separate signal to a dedicated drive mechanism for the biasing apparatus. In either embodiment, the user actuates the biasing apparatus (e.g., reverse drive motor 11 or send, a signal to a dedicated motor) in a variety of manners.

In accordance with various embodiments, the material 19 is cut, perforated, or severed by reversal of the motor. In embodiments with a movable biasing apparatus 120 this causes the apparatus 120 to move as well. The reversal of the motor is actuated in a variety of manners. For example, the motor is programed to operate for a fixed length of time or for a fixed number of revolutions that corresponds to a set length of dunnage material. After the fixed period, the motor reverses actuating the biasing apparatus 120. Other measurement devices and/or sensors may also be used to determine the length of dunnage and cause the motor to reverse. A sensor may detect portions of the dunnage material 21 such as certain perforations or attachment points. In other embodiments, a sensor detects the length of dunnage material 21 through the system and the system calculates the desired point at which to sever the dunnage material 21 based on predetermined input. In various embodiments, a plurality or all of these sensing techniques are alternatively selected on a single device. The motor is actuated by a trigger (e.g., a foot pedal) that, while engaged, causes the device to dispense dunnage. In response to the trigger being released, the motor reverses causing the dunnage to be cut, perforated, or severed. In some embodiments, the cutting mechanism is actuated simply be pressing a switch which causes the motor to reverse. Upon receipt of an appropriate trigger force from a switch (such as a foot pedal, button, hand trigger, etc.), the sensing unit sends a signal to the driving portion to initiate a short rotational movement in the direction opposite the dispensing direction, thereby causing the dunnage material 21 to be pulled in a reverse direction. As indicated above, in instance incorporating a movable biasing mechanism, this causes the biasing member to engage the material 19. This reverse action partially or fully tears or severs the dunnage material 21. Release of a switch such as a foot pedal may also send the signal to the driving portion to initiate the short rotational movement.

In some embodiments, the reverse rotational pulse initiated by the motor 11 is less than a millisecond in duration, or less than 10 milliseconds in duration, or less than 100 seconds in duration. As indicated above, a variety of mechanisms may cause a reverse rotation in the motor 11, including a preprogrammed interval, a button actuation, a release of a feed trigger, or some manipulation of the dunnage material 21 such as a pull. Any duration of any of these or other actuation methods are operable to actuate the reverse system. Examples of actuation methods are discussed above, examples of actuating by pulling the material are disclosed in U.S. Pat. Pub. No. 2013/0092716.

As discussed above, any stock material may be used. For example, the stock material may have a basis weight of about at least 20 lbs., to about at most 100 lbs. The stock material 19 comprises paper stock stored in a high-density configuration having a first longitudinal end and a second longitudinal end that is later converted into a low-density configuration. The stock material 19 is a ribbon of sheet material that is stored in a fan-fold structure, as shown in FIG. 1A, or in coreless rolls as disclosed in Pat. Pub. No. 123456. The stock material is formed or stored as single-ply or multiple plies of material. Where multi-ply material is used, a layer can include multiple plies. It is also appreciated that other types of material can be used, such as pulp-based virgin and recycled papers, newsprint, cellulose and starch compositions, and poly or synthetic material, of suitable thickness, weight, and dimensions.

In various embodiments, the stock material includes an attachment mechanism such as an adhesive portion that is operable as a connecting member between adjacent portions of stock material. Preferably, the adhesive portion facilitates daisy-chaining the rolls together to form a continuous stream of sheet material that can be fed into the converting station 70.

The preceding systems and apparatus are utilized in accordance with any of a variety of methods and control systems. For example, controllers may also include a computer-accessible medium (e.g., as described herein above, a storage device such as a hard disk, floppy disk, memory stick, CD-ROM, RAM, ROM, etc., or a collection thereof) can be provided (e.g., in communication with a processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes and methods, as described herein above, for example. Such control systems and methods may include those disclosed in U.S. Pat. Pub. No. 2013/0092716. However, other systems may be used as well.

The term "about," as used herein, should generally be understood to refer to both the corresponding number and a range of numbers. Moreover, all numerical ranges herein should be understood to include each whole integer within the range. If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. A method for processing a dunnage material, the method comprising:

converting supply material into low-density dunnage and moving the dunnage in a dispensing direction along a material path;

bending, by a biasing member, the dunnage to deflect the material path around an end of a cutting member; and in response to the dunnage being retracted back, causing the cutting member to begin to sever the dunnage material.

2. The method of claim 1, further comprising bending the dunnage to provide an elbow in the material path where the dunnage is bent around the cutting member by moving the biasing member to a cutting position, wherein when the dunnage material is driven in a dispensing direction, the elbow in the dunnage material is biased away from the cutting member, and in a reverse direction the elbow is biased toward the cutting member to begin the severing of the dunnage.

3. The method of claim 2, wherein moving the biasing member to the cutting position causes one or more fingers of the biasing member to fit within teeth of the cutting member.

4. The method of claim 2, further comprising moving the dispensing member from the cutting position to a dispensing position in which the dunnage material is dispensed past the cutting member.

5. The method of claim 3, further comprising rotating a drum contacts the dunnage material to advance the dunnage material in a first direction and retract the dunnage material in a second direction, wherein the drum drives a biasing linkage that actuates the biasing member.

6. The method of claim 1, wherein the bending the dunnage to deflect the material path comprising forming a bend of at least 25°.

7. The method of claim 6, wherein the bending the dunnage to deflect the material path comprising forming a bend of at least 45°.

8. The method of claim 1, wherein converting supply material into low-density dunnage comprises crumpling the supply material.

9. The method of claim 1, wherein bending the dunnage to deflect the material path comprises forcing, by the biasing member, the dunnage material against the cutting member when the biasing member is in a cutting position.

10. The method of claim 1, wherein, in the cutting position, the biasing member contacts the dunnage material downstream of the cutting member, and is out of contact with the dunnage material at a longitudinal location at which the dunnage material contacts the cutting member.

11. The method of claim 1, further comprising moving the biasing member to a cutting position and biasing the dunnage material around the end in response to a driving mechanism driving the dunnage in a second direction opposite to a first direction that causes the dunnage material to be dispensed.

12. The method of claim 11, further comprising moving the biasing member to a dispensing position away from the cutting member such that the dunnage material is not biased around the end of the cutting member.

13. The method of claim 1, further comprising pivoting the biasing member between a cutting position for bending the dunnage to deflect the material path around the end of the cutting member and a dispensing position away from the cutting member to allow the crumpled dunnage to be dispensed past a cutting member.

14. A method for processing a dunnage material, the method comprising:

in a dunnage crumpling device, crumpling supply material into low-density dunnage and moving the dunnage in a dispensing direction along a material path while maintaining a biasing member in a dispensing position sufficiently spaced from the material path to allow the crumpled dunnage to be dispensed past a cutting member;

moving the biasing member from the dispensing position to a cutting position in bending, by a biasing member such that the biasing member deflects dunnage in the material path around an edge of the cutting member; and with the biasing member in the cutting position, retracting the dunnage backwards, causing the cutting member to begin to sever the dunnage material.

15. The method of claim 14, wherein the biasing member is moved from the dispensing position to the cutting position when the dispensing is stopped.

16. The method of claim 14, wherein moving the biasing member from the dispensing position to the cutting position comprises pivoting the biasing member.

17. The method of claim 14, wherein the biasing member is disposed further from the cutting member in the dispensing position than in the cutting position such that the dunnage material is not biased around the edge of the cutting member.

18. The method of claim 14, wherein the cutting member comprises a blade oriented in a generally downstream direction along the material path.

19. The method of claim 14, further comprising, upon severing the dunnage material:

moving the biasing member from the cutting position to the dispensing position; and crumpling additional supply material into additional low-density dunnage and moving the additional dunnage in the dispensing direction such that the biasing member in the dispensing position allows the additional dunnage to be dispensed past the cutting member.

* * * * *